United States Patent
John et al.

(10) Patent No.: US 11,640,455 B2
(45) Date of Patent: May 2, 2023

(54) SYSTEMS AND METHODS FOR DYNAMIC POLYCHROME LATTICE IMAGE SECURITY

(71) Applicant: BANK OF AMERICA CORPORATION, Charlotte, NC (US)

(72) Inventors: Jiji John, Tamilnadu (IN); Atul Sharma, Haryana (IN); Ashok Thapliyal, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 219 days.

(21) Appl. No.: 17/332,555

(22) Filed: May 27, 2021

(65) Prior Publication Data
US 2022/0382847 A1 Dec. 1, 2022

(51) Int. Cl.
G06F 21/36 (2013.01)
H04L 9/30 (2006.01)

(52) U.S. Cl.
CPC ............ *G06F 21/36* (2013.01); *H04L 9/3073* (2013.01)

(58) Field of Classification Search
None
See application file for complete search history.

(56) References Cited

U.S. PATENT DOCUMENTS

| | | | |
|---|---|---|---|
| 7,966,497 B2 | 6/2011 | Gantman et al. | |
| 8,332,320 B2 | 12/2012 | Singh | |
| 8,550,366 B2 | 10/2013 | Myodo et al. | |
| 8,868,902 B1* | 10/2014 | Brown | G06Q 20/40145 713/186 |
| 9,071,583 B2 | 6/2015 | Yang et al. | |
| 9,111,186 B2 | 8/2015 | Blasinski et al. | |
| 9,253,131 B2 | 2/2016 | Blair | |
| 9,646,296 B2* | 5/2017 | Brown | H04L 63/0838 |
| 9,697,447 B2 | 7/2017 | Schory et al. | |
| 9,721,248 B2 | 8/2017 | Bondesen et al. | |
| 9,805,296 B2 | 10/2017 | Loy et al. | |
| 10,089,508 B2 | 10/2018 | Arce et al. | |
| 10,127,724 B2 | 11/2018 | Carre et al. | |
| 10,152,663 B2 | 12/2018 | Arce et al. | |
| 10,313,332 B2* | 6/2019 | Hong | H04L 63/0838 |
| 10,409,974 B2 | 9/2019 | Vaughn et al. | |
| 10,467,604 B1 | 11/2019 | Dorsch et al. | |

(Continued)

OTHER PUBLICATIONS

Haupert V, Müller T. On App-based Matrix Code Authentication in Online Banking. InICISSP 2018 (pp. 149-160). (Year: 2018).*

(Continued)

*Primary Examiner* — James R Turchen
(74) *Attorney, Agent, or Firm* — Moore & Van Allen PLLC; Nicholas C. Russell (57) ABSTRACT

The invention includes a tool for the generation and usage of a dynamic polychrome lattice image for unique and secure authentication and verification purposes. The tool is multi-purposed and can be applied to a variety of use cases and may utilize multiple channels of communication between devices. The dynamic polychrome lattice image may be adjusted according to the display size and resolution of various user devices. System devices may scan the dynamic polychrome lattice image, and upon successful retrieval and decryption of the dynamic polychrome lattice image, the user may be authenticated and verified to access one or more programs or services.

20 Claims, 6 Drawing Sheets

(56) References Cited

U.S. PATENT DOCUMENTS

| | | | |
|---|---|---|---|
| 10,579,987 B2* | 3/2020 | Chen | G06Q 20/401 |
| 2011/0055898 A1 | 3/2011 | Jou et al. | |
| 2014/0025582 A1 | 1/2014 | Maevsky | |
| 2014/0100973 A1* | 4/2014 | Brown | G06Q 20/322 |
| | | | 705/17 |
| 2014/0346231 A1* | 11/2014 | Al-Omari | G06K 19/0614 |
| | | | 235/494 |
| 2014/0358777 A1 | 12/2014 | Gueh | |
| 2015/0089593 A1 | 3/2015 | Herman et al. | |
| 2015/0227946 A1* | 8/2015 | Huang | G06Q 30/0185 |
| | | | 235/494 |
| 2017/0034685 A1 | 2/2017 | Jiang et al. | |
| 2020/0005263 A1 | 1/2020 | Arora et al. | |
| 2020/0364323 A1* | 11/2020 | Bendersky | G06K 19/06037 |
| 2021/0304209 A1* | 9/2021 | Chen | G06Q 20/3829 |
| 2022/0358481 A1* | 11/2022 | Hatanaka | G06Q 20/1085 |

OTHER PUBLICATIONS

Starnberger G, Froihofer L, Gbschka KM. QR-TAN: Secure mobile transaction authentication. In2009 International Conference on Availability, Reliability and Security Mar. 16, 2009 (pp. 578-583). IEEE. (Year: 2009).*

Shin D. Using a two dimensional colorized barcode solution for authentication in pervasive computing. In2006 ACS/IEEE International Conference on Pervasive Services Jun. 26, 2006 (pp. 173-180). IEEE. (Year: 2006).*

* cited by examiner

SYSTEMS AND METHODS FOR DYNAMIC POLYCHROME LATTICE IMAGE SECURITY

FIELD OF THE INVENTION

The present invention is generally related to systems and methods for enhanced security using uniquely encrypted data.

BACKGROUND

Existing systems for authentication and verification of users via electronic devices may be limited by conventional encryption and display techniques. As such, there is a need for systems that are more dynamic in nature and provide a wider array of potential iterations of randomized encoded output to increase security.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. As stated, there is a need for systems that are more dynamic in nature and provide a wider array of potential iterations of randomized encoded output to increase security.

The system and methods described herein utilize a unique approach to securely verifying and authenticating users of electronic devices through the generation of dynamic polychrome lattice images which encode a unique identifier. The dynamic polychrome lattice image may be generated in response to any number of requests for access, information, services, or the like. The unique identifier may be embedded in the dynamic polychrome lattice image via a multi-colored array which is arranged according to a specific algorithm and ensures uniformity in structure between dynamic polychrome lattice images, while retaining a degree of randomness that is extremely hard to decode without a permissible scanning tool. The frame of the dynamic polychrome lattice image may comprise a well-defined structure with a number of sub-parts, blocks, or the like, which are of equal size and are arranged relative to pre-defined anchor points at or near the boundaries the dynamic polychrome lattice image.

The invention includes a tool for the generation and usage of a dynamic polychrome lattice image for unique and secure authentication and verification purposes. The tool is multi-purposed and can be applied to a variety of use cases and may utilize multiple channels of communication between devices. The dynamic polychrome lattice image may be adjusted according to the display size and resolution of various user devices. System devices may scan the dynamic polychrome lattice image, and upon successful retrieval and decryption of the dynamic polychrome lattice image, the user may be authenticated and verified to access one or more programs or services.

Embodiments of the present invention address the above needs and/or achieve other advantages by providing apparatuses (e.g., a system, computer program product and/or other devices) and methods for generation and decryption of dynamic polychrome lattice images. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention generally comprises the steps of receiving an authentication request or transaction request from a user device; generating unique alphanumeric code for the authentication or transaction request using combination of a prefix value, a hashed timestamp, and a hashed random sequence; storing the unique alphanumeric code as a transaction identifier and log the prefix value, the hashed timestamp, and the hashed random sequence with the transaction identifier as a key value pair; assigning colors from a color palette to each digit of the transaction identifier and store the color assignments as color mapping data; generating x and y coordinate values for an image map; calculating coordinates for subparts of the image map for each of the color assignments; and based on the calculated coordinates and color assignments, rendering a polychrome lattice image.

In some embodiments, the invention performs the steps of: receiving a scanned image of the rendered polychrome lattice image; determining a resolution of the scanned image of the rendered polychrome lattice image; converting the scanned image of the rendered polychrome lattice image to an original lattice resolution to generate a normalized polychrome lattice image; determining a reference point on the normalized polychrome lattice image; identifying the subparts and colors of the subparts of the image map on the normalized polychrome lattice image; locating the key value pair for the normalized polychrome lattice image in a historical database; decrypting identified color codes to reveal the unique alphanumeric code for the authentication request or transaction request; and authenticating a user or a transaction.

In some embodiments, colors are assigned from a color palette for each digit of the transaction identifier randomly or pseudo-randomly.

In further embodiments, the x and y coordinate values for the image map are randomly or pseudo-randomly selected from a set of numbers including or between 1 and 7.

In still further embodiments, the image map further comprises a frame of 24 by 24 equally sized square or rectangular sections.

In other embodiments, the subparts further comprise areas of 4 by 4 equally sized square or rectangular sections of the frame.

In some embodiments, a top of the frame is denoted by a black square or rectangular section, and a bottom of the frame is denoted by a red square or rectangular section.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user datastore that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more promotions/coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system for adjustment of resource allocation based on multi-channel inputs in order to obtain information relevant to the user's business.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

Figure 1:
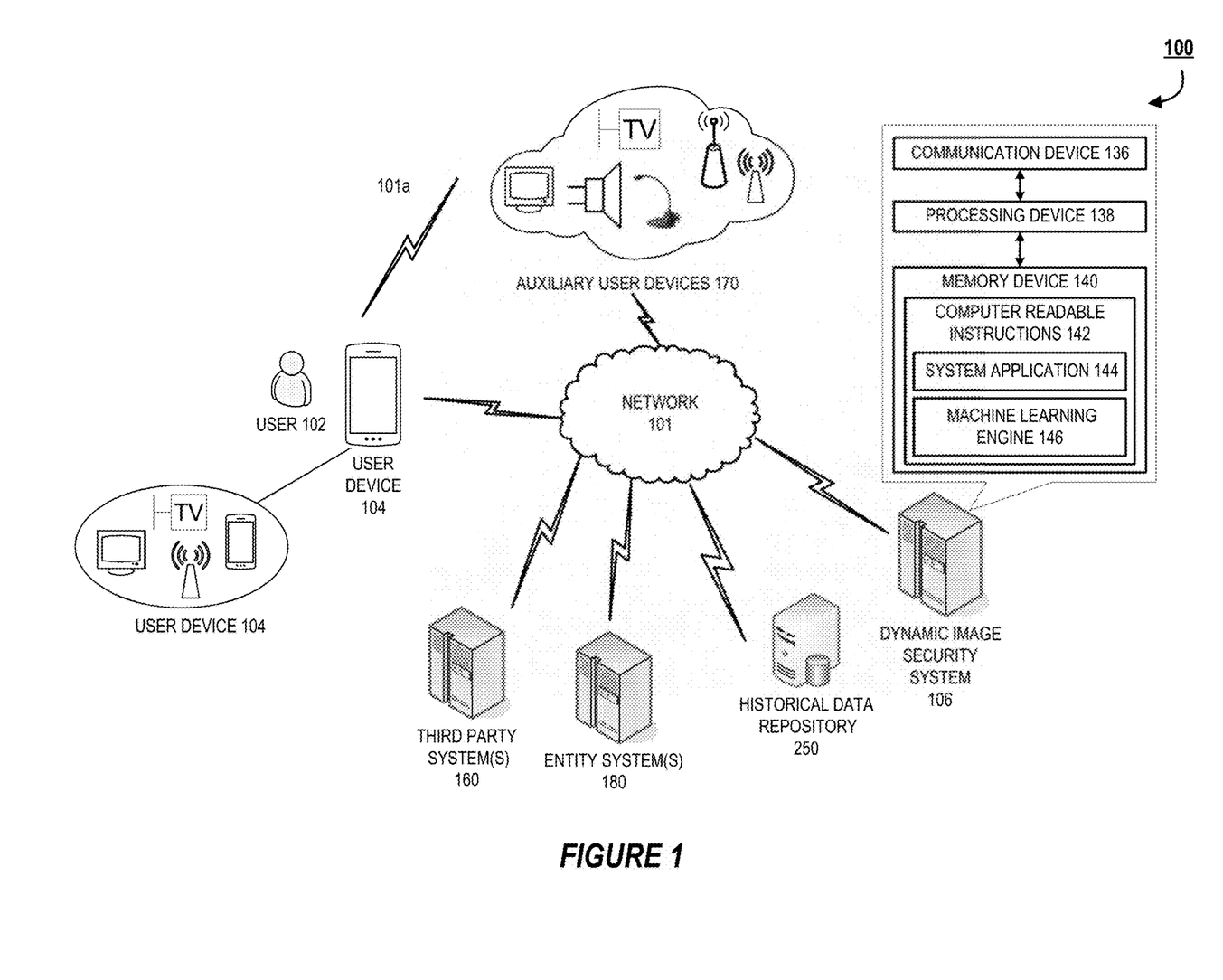
FIG. 1 depicts a system environment 100 providing a system for dynamic polychrome lattice image security, in accordance with one embodiment of the present invention.

FIG. 1 depicts a system environment 100 providing a system for dynamic polychrome lattice image security, in accordance with one embodiment of the present invention. As illustrated in FIG. 1, a dynamic image security system 106, configured for providing an intelligent, proactive and responsive application or system, at a user device 104, which facilitates authentication and validation of user(s) 102 via one or more user device(s) 104. The resource technology system is operatively coupled, via a network 101 to one or more user devices 104, auxiliary user devices 170, to entity systems 180, historical data repository 250, third party systems 160, and other external systems/third-party servers not illustrated herein. In this way, the dynamic image security system 106 can send information to and receive information from multiple user devices 104 and auxiliary user devices 170 to provide an integrated platform with multi-channel communication capabilities to a user 102, and particularly to the user device 104. At least a portion of the system is typically configured to reside on the user device 104, on the dynamic image security system 106 (for example, at the system application 144), and/or on other devices and system and is an intelligent, proactive, responsive system that facilitates analysis and secure storage of information.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary user device(s) 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device (e.g., tapping an NFC enabled payment instrument at a point-of-sale (POS) terminal, wherein the POS terminal may be an auxiliary user device 170).

In some embodiments, the user 102 is an individual that wishes to conduct one or more transactions, access one or more resource accounts, access data on the dynamic image security system 106, the entity system 180, or the historical data repository 250, and in some embodiments may employ the user device 104 in order to do so. In some embodiments, the user 102 may access the dynamic image security system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104. In some embodiments, the user application is a user application 538, also referred to as a "user application" herein, provided by and stored on the user device 104 by the dynamic image security system 106. In some embodiments the user application 538 may refer to a third party application or a user application stored on a cloud used to access the dynamic image security system 106 and/or the auxiliary user device 170 through the network 101, communicate with or receive and interpret signals from auxiliary user devices 170, and the like. In some embodiments, the user application is stored on the memory device of the dynamic image security system 106, and the user interface is presented on a display device of the user device 104, while in other embodiments, the user application is stored on the user device 104. It is understood that the one or more auxiliary user devices 170 may be used to further gather relevant data for the dynamic image security system 106 to use in analysis and storage functions. For instance, relevant data collected from auxiliary user devices 170 may further inform the system of a user's identity, relationships to other users, or the like.

Figure 2:
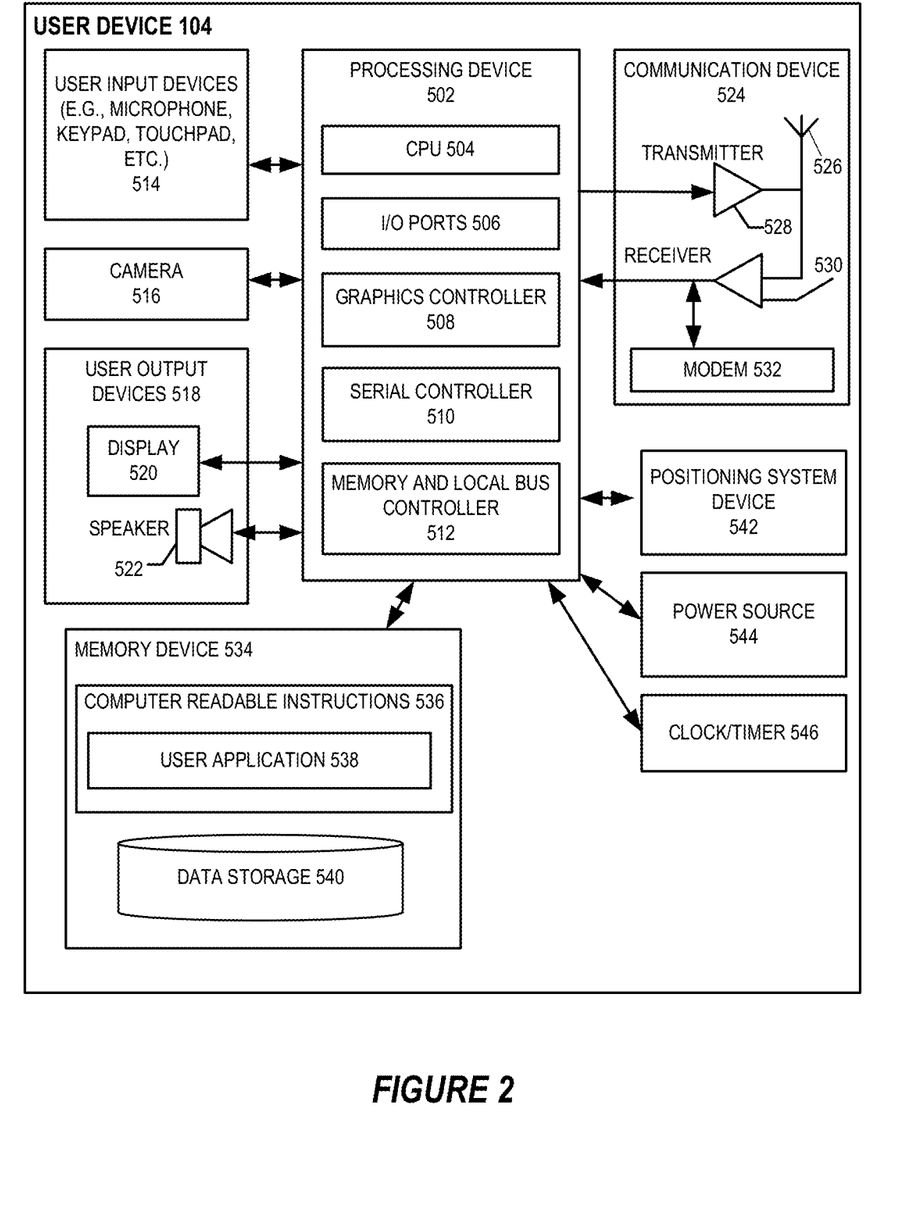
FIG. 2 provides a block diagram of the user device 104, in accordance with one embodiment of the invention.

The user 102 may subsequently navigate through the interface or initiate one or more user activities or resource transfers using a central user interface provided by the user application 538 of the user device 104. In some embodiments, the user 102 may be routed to a particular destination or entity location using the user device 104. In some embodiments the auxiliary user device 170 requests and/or receives additional information from the dynamic image security system 106/the third party systems 160 and/or the user device 104 for authenticating the user and/or the user device, determining appropriate queues, executing information queries, and other functions. FIG. 2 provides a more in depth illustration of the user device 104.

As further illustrated in FIG. 1, the dynamic image security system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the third party systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the dynamic image security system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices to perform one or more steps described herein. In some embodiments, the memory device 140 includes a data storage for storing data related to user transactions and resource entity information, but not limited to data created and/or used by the system application 144.

FIG. 1 further illustrates one or more auxiliary user devices 170, in communication with the network 101. The auxiliary user devices 170 may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the services provided to the user via the user application, that may perform one or more user activities either alone or in conjunction with the dynamic image security system 106, and specifically, the system application 144, one or more auxiliary user device 170, and the like in order to provide an intelligent system for data analysis, storage, and monitoring.

Also pictured in FIG. 1 are one or more third party systems 160, which are operatively connected to the dynamic image security system 106 via network 101 in order to transmit data associated with user activities, user authentication, user verification, transactions, and the like. In some embodiments, the third party system 160 may be a merchant or party to a transaction in which the user is the counterparty. In other embodiments, the third party system 160 may represent a financial institution where the user maintains one or more resource accounts. The capabilities of the dynamic image security system 106 may be leveraged in some embodiments by third party systems in order to authenticate user actions based on data provided by the third party systems 160, third party applications running on the user device 104 or auxiliary user devices 170, as analyzed and compared to data stored by the dynamic image security system 106, such as data stored in the historical data repository 250 or stored at entity systems 180. In some embodiments, the data storage and processing capabilities of data monitoring system 106 may be provided as a service by the dynamic image security system 106 to the entity systems 180, third party systems 160, or additional systems and servers not pictured, through the use of an application programming interface ("API") designed to simplify the communication protocol for client-side requests for data or services from the dynamic image security system 106. In this way, the capabilities offered by the present invention may be leveraged by multiple parties other than the those controlling the dynamic image security system 106 or entity systems 180. In other embodiments, the third party systems 160 may be provided permissioned access to data of the dynamic image security system 106 via a password protected web interface, password protected link, permissioned access to portions of the historical data repository 250, or a link to certain encrypted information on the historical data repository 250 which can be decrypted or contextualized at a later time in order to provide dynamic image security as a software-based service.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, and the like), a communication device or network interface device 524, a power source 544, a clock or other timer 546, a visual capture device such as a camera 516 (or other optical sensor, or the like), a positioning system device 542, such as a geo-positioning system device like a GPS device, an accelerometer, and the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application. The user application 538 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application. In some embodiments, the user application 538 allows a user 102 to access and/or interact with other systems such as the entity system 180, third party system 160, or dynamic image security system 106. In one embodiment, the user 102 is a maintaining entity of a dynamic image security system 106, wherein the user application enables the user 102 to configure the dynamic image security system 106 or its components. In one embodiment, the user 102 is a customer of a financial entity and the user application 538 is an online banking application providing access to the entity system 180 wherein the user may interact with a resource account via a user interface of the multi-channel resource application, wherein the user interactions may be provided in a data stream as an input via multiple channels. In some embodiments, the user 102 may a customer of third party system 160 that requires the use or capabilities of the dynamic image security system 106 for authorization or verification purposes.

The processing device 502 may be configured to use the communication device 524 to communicate with one or more other devices on a network 101 such as, but not limited to the entity system 180 and the dynamic image security system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, millimeter wave technology communication protocols, and/or the like. The user device 104 may also be configured to operate in accordance with non-cellular communication mechanisms, such as via a wireless local area network (WLAN) or other communication/data networks. The user device 104 may also be configured to operate in accordance with an audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 180 which is connected to the user device 104 and the dynamic image security system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the dynamic image security system 106 to provide access to user accounts stored and maintained on the entity system 180. In some embodiments, the entity system 180 may communicate with the dynamic image security system 106 during an interaction with a user 102 in real-time, wherein user interactions may be logged and processed by the dynamic image security system 106 in order to analyze interactions with the user 102 and reconfigure the machine learning model in response to changes in a received or logged data stream. In one embodiment, the system is configured to receive data for decisioning, wherein the received data is processed and analyzed by the machine learning model to determine a conclusion.

Figure 3:
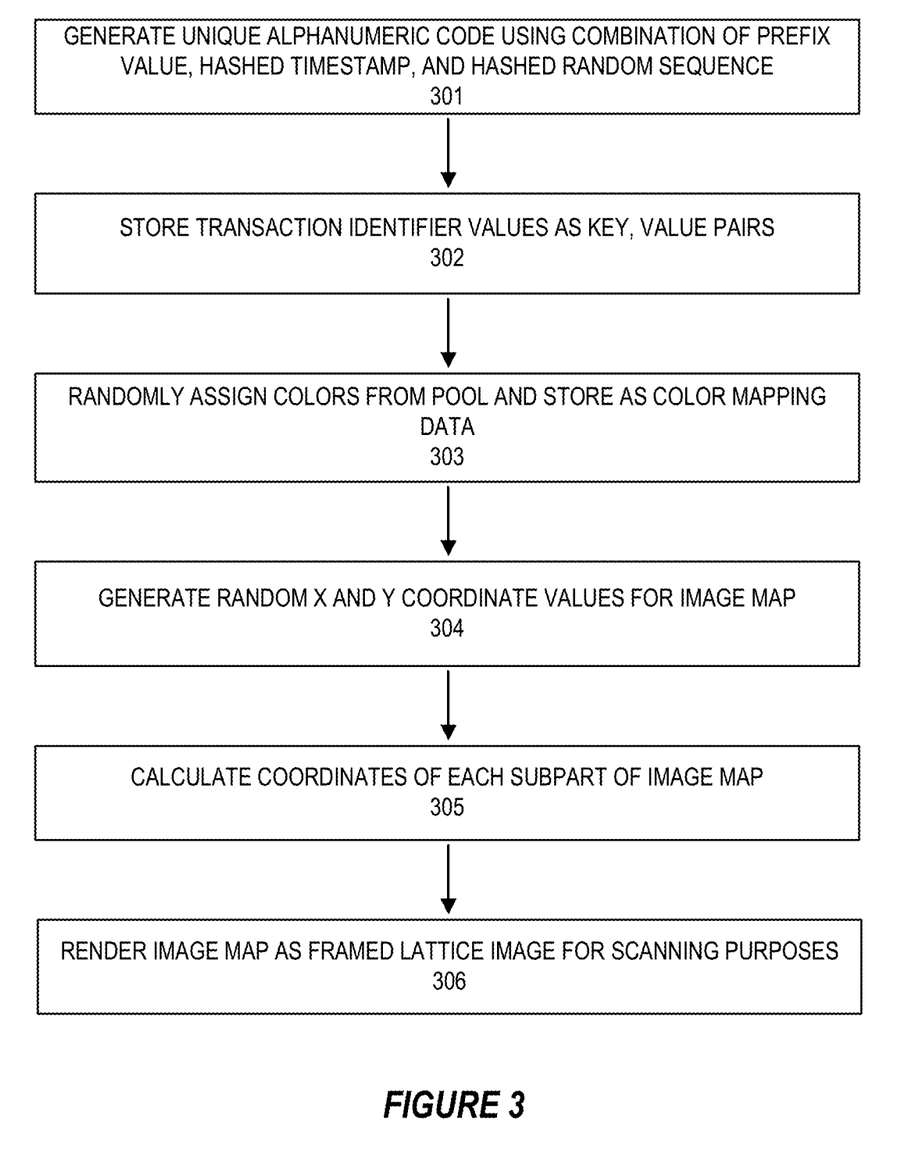
FIG. 3 provides a high level process flow for generation of a dynamic polychrome lattice image, in accordance with one embodiment of the invention.

FIG. 3 provides a high level process flow for generation of a dynamic polychrome lattice image, in accordance with one embodiment of the invention. As shown in block 301, the process begins by generating a unique alphanumeric code, also referred to as a transaction identifier in some embodiments, for a transaction or verification request, using combination of prefix value, hashed timestamp, and hashed random sequence. In some embodiments, the unique alphanumeric code is a 16 digit alphanumeric code (e.g. ABABABAB12121212). For each digit of the transaction identifier, particular positions on a dynamic polychrome lattice image are stored as key, value pairs (e.g., digit map={{1, M}, {2,C}, {3,D} . . . {15,5}416,41}, or the like), as indicated by block 302. Moving to block 303, for each digit in of the transaction identifier, colors are randomly or pseudo-randomly chosen (e.g., via a deterministic random bit generator, or the like), by the system from a color pool (e.g., a color palette containing the largest possible set of unique colors, such as Red Green Blue (RGB), standard Red Green Blue (sRGB), hue saturation value (HSV), or the like) and are stored in a data map, (e.g., Color Map={{1, #FFFF00}, {2, #808000}, {3, #008000} . . . {15, #00FFF7} {16, #00FF00}}, or the like). It is understood that each of the 16 colors are different and unique for each and every transaction or verification request, and these colors are stored in aforementioned databases, such as historical data repository 250, based on position and index, irrespective of the underlying digit value of the transaction identifier or the original transaction or verification request. In some embodiments, the frame is a well-defined structure with 24 by 24 equal size square blocks having the top left and top right square block(s) colored in black. In some embodiments, the frame is a well-defined structure with 24 by 24 equal size square blocks having the bottom left and bottom right square block(s) colored in red. While the size of the frame and the dynamic polychrome lattice image itself may vary in each embodiment, in each case the size of the frame is defined as FW*FH, where frame FW=Frame width and FH=Frame Height, as depicted later with respect to FIG. 5.

Next, as indicated in block 304, in some embodiments the system generates two random or pseudo-random numbers 'x' and 'y', such as between 1 and 7, or the like (wherein 1 and 7 are both inclusive). This random number ensures that the grid is positioned dynamically within the frame. The 'x' denotes horizontal axis and 'y' denotes vertical axis. With respect to top left black colored square block, moving 'x' square blocks to the right and then 'y' squares down towards the bottom will be the starting position (i.e. coordinates) of multi-color grid of the dynamic polychrome lattice image. The starting point coordinates (x, y) are saved for retrieval and verification processes along with the metadata of the transaction or authentication request. The top left is assumed to start at index (0,0), with the dynamic polychrome lattice image itself having 16 by 16 equal size square blocks divided into 16 sub-parts (e.g., P1, P2 . . . P16, or the like). Each subpart, equal to 4 by 4 equal size square blocks, is colored as per the color codes defined in the color map. The coordinates of each subpart are calculated, relative to the starting point co-ordinates, as: P1E1=(x,y), P1E2=(x+4,y), P1E3=(x,y+4), P1E4=(x+4,y+4), P2E1=(x+4,y+4), P2E2=(x+8,y+4), P2E3=(x+4,y+8), P2E4=(x+8,y+8), and so on, as indicated in block 305. Finally, as shown in block 306, once the lattice image is generated with a unique color in each part, the entire frame is rendered in the screen as an image for scanning purposes. It is understood that the size and image resolution of the dynamic polychrome lattice image can be proportionally adjusted as per the screen size(s) (e.g., various user devices, such as mobile screen, laptop, tablet, ATM terminal window, or the like).

Figure 4:
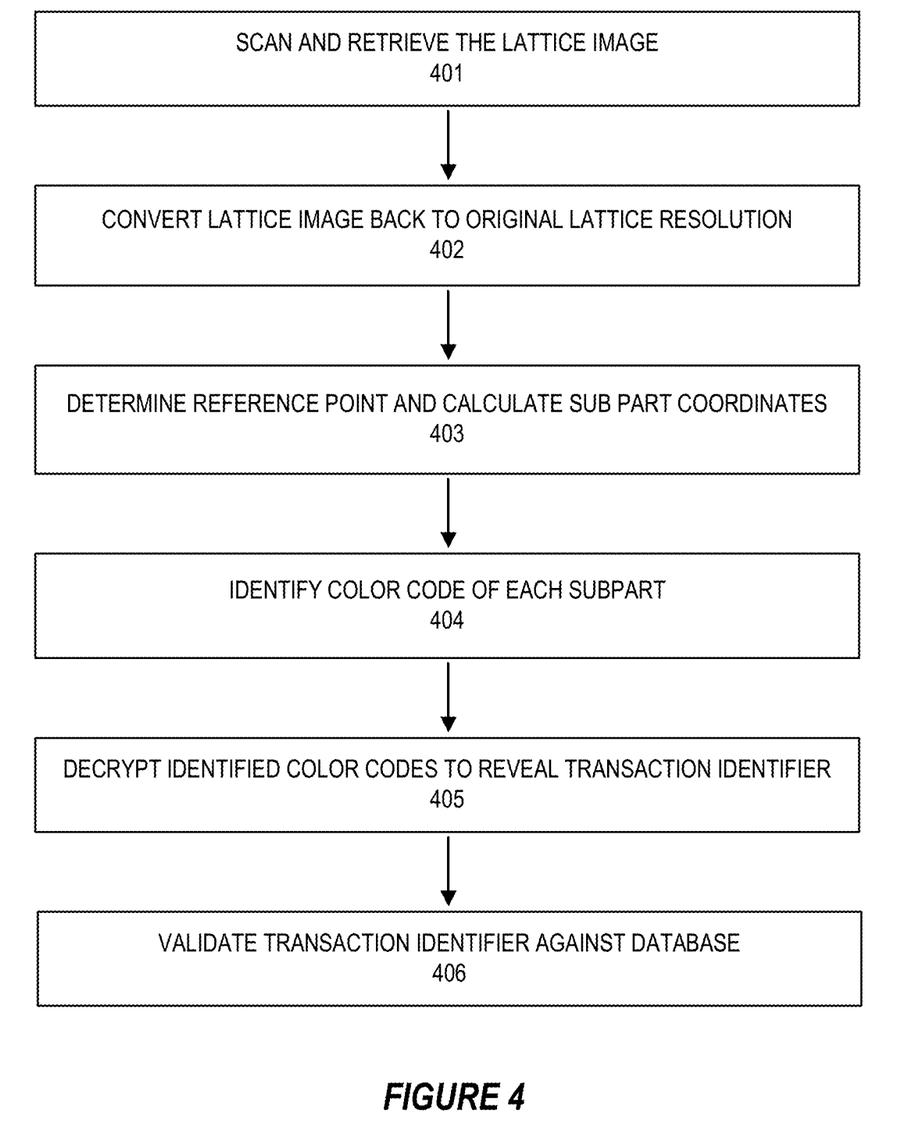
FIG. 4 provides a high level process flow for retrieval and decryption of a dynamic polychrome lattice image, in accordance with one embodiment of the invention.

FIG. 4 provides a high level process flow for retrieval and decryption of a dynamic polychrome lattice image, in accordance with one embodiment of the invention. As shown in block 401, the process begins wherein the system scans and retrieves the frame, and the frame is again converted in 24 by 24 equal size square blocks, or the original lattice resolution as indicated in block 402. Based on saved coordinates (x, y), the starting position of the dynamic polychrome lattice image with respect to the top left (e.g., black colored square block, or the like) corner is determined and coordinates for each part are calculated based on the block sizes for each part (e.g., 4 by 4 equal size square blocks, or the like, according to each embodiment) within the dynamic polychrome lattice image (e.g., 16 by 16 equal size square blocks, or the like, according to each embodiment), as shown in block 403. As indicated in block 404, the color code for each part within the image is then identified using a color picker tool, such as a software tool designed to generate a corresponding color palette value based on selected data (e.g., RGB, sRGB, HSV, or the like). Next, as shown in block 405, the color codes values for each part are checked against the data stored in the system historical data repository 250, and decrypted to reveal the transaction identifier. In some embodiments, the system may also receive user data, device data, username data, password data, or the like in order to enhance security of the process, or in order to check these datapoints against a user database in the historical data repository 250 and quickly locate the previously generated dynamic polychrome lattice images for one or more specific users, or the like. Once the decrypted transaction identifier is successfully validated against the historical database, the user may be verified, authenticated, or the like, or the transaction is authenticated, verified, or the like, as shown in block 406.

Figure 5:
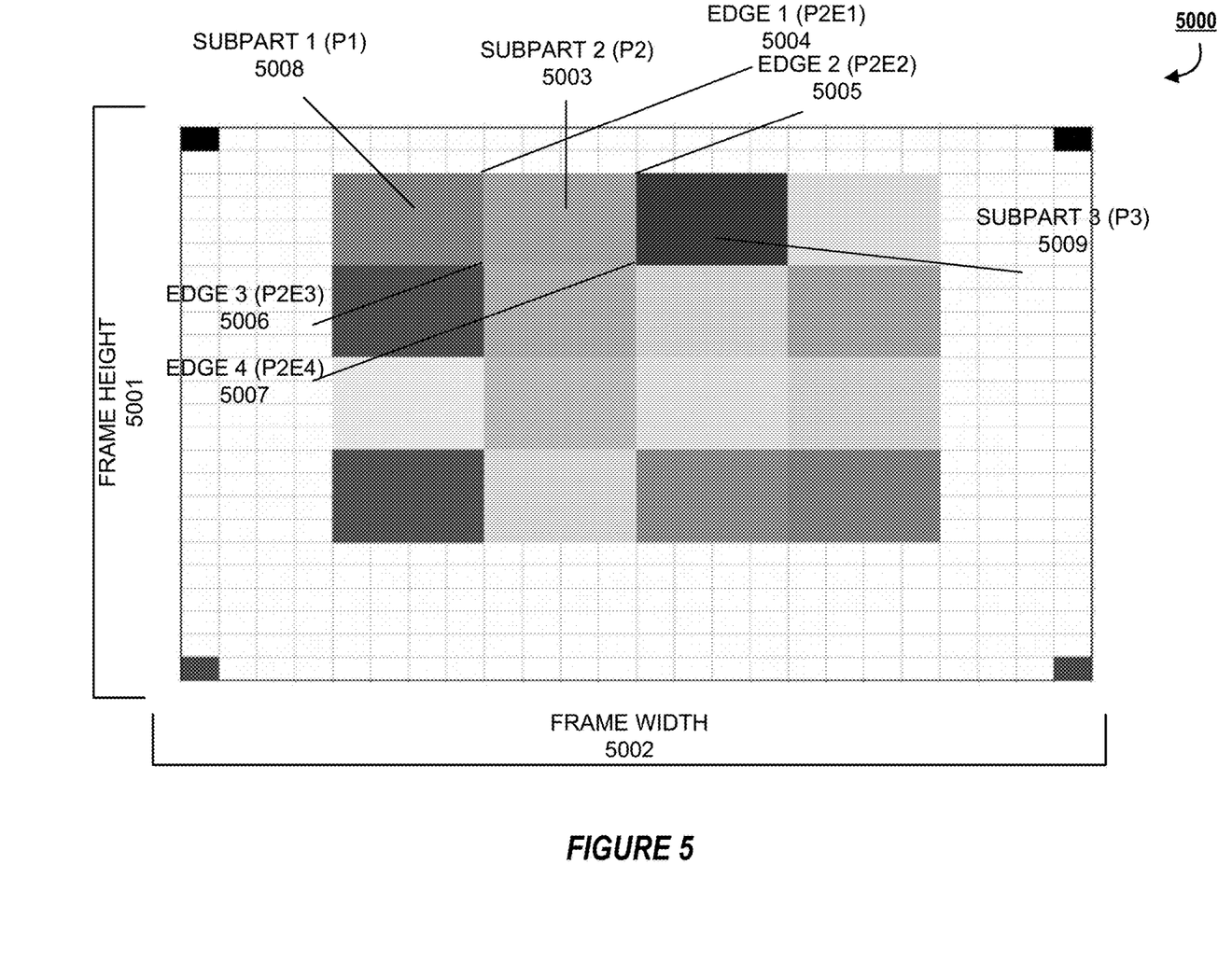
FIG. 5 provides a graphical depiction for generation of a dynamic polychrome lattice image, in accordance with one embodiment of the invention.

FIG. 5 provides a graphical depiction 5000 for generation of a dynamic polychrome lattice image, in accordance with one embodiment of the invention. FIG. 5 generally follows the exemplary embodiment as described in FIGS. 3 and 4, but one of ordinary skill in the art will appreciate that other embodiments may exist where the frame, dynamic polychrome lattice image, or the like differ in their size, structure, coordinate ratios, or the like. As discussed, once a transaction or authentication request has been used to generate a unique alphanumeric code, such as a 16 digit alphanumeric code (e.g. ABABABAB12121212), each digit of the unique code, or transaction identifier, may be used to determine particular positions on a dynamic polychrome lattice image, and this data is stored as key, value pairs (e.g., digit map={{1, M}, {2,C}, {3,D} . . . {15,5}, {16,4} }, or the like). For each digit in of the transaction identifier, colors are randomly or pseudo-randomly chosen by the system, as depicted in FIG. 5, and are stored in a data map. It is understood that each of the 16 colors are different and unique for each and every transaction or verification request, and these colors are stored in aforementioned databases, such as historical data repository 250, based on position and index. In some embodiments, the frame is a well-defined structure with 24 by 24 equal size square blocks having the top left and top right square block(s) colored in black. In some embodiments, the frame is a well-defined structure with 24 by 24 equal size square blocks having the bottom left and bottom right square block(s) colored in red. While the size of the frame and the dynamic polychrome lattice image itself may vary in each embodiment, in each case the size of the frame is defined as FW*FH, where frame FW=Frame width and FH=Frame Height, as depicted in FIG. 5 as frame height 5001 and frame width 5002.

In some embodiments the system generates two random or pseudo-random numbers 'x' and 'y', such as between 1 and 7, or the like (wherein 1 and 7 are both inclusive). This random number ensures that the grid of the dynamic polychrome lattice image is positioned dynamically within the frame. The 'x' denotes horizontal axis along the frame width 5002 and 'y' denotes vertical axis along frame height 5001. With respect to top left black colored square block, moving 'x' square blocks to the right and then 'y' squares down towards the bottom will be the starting position (i.e. coordinates) of multi-color grid of the dynamic polychrome lattice image. The starting point coordinates (x, y) are saved for retrieval and verification processes along with the metadata of the transaction or authentication request. The top left is assumed to start at index (0,0), with the dynamic polychrome lattice image itself having 16 by 16 equal size square blocks divided into 16 sub-parts (e.g., P1, P2 . . . P16, or the like). For example, shown in FIG. 5 is a labeled subpart 2 (P2) 5003. Each subpart, equal to 4 by 4 equal size square blocks, is colored as per the color codes defined in the color map. The coordinates of each subpart are calculated, relative to the starting point co-ordinates, as, for example: P1E1= (x,y), P1E2=(x+4,y), P1E3=(x,y+4), P1E4=(x+4,y+4), P2E1=(x+4,y), P2E2=(x+8,y), P2E3=(x+4,y+4), P2E4=(x+8,y+4), and so on, as indicated with respect to a P2 5003 in FIG. 5. As shown in the example of FIG. 5, subpart 2 5003 may be denoted by the coordinates of its four edge values, edge 1 (P2E1) 5004, edge 2 (P2E2) 5005, edge 3 (P2E3) 5006, and edge 4 (P2E4) 5007. It is understood that each subpart may share one or more edge value coordinates with an adjoining subpart, such as in the case of the example of subpart 2 shown in FIG. 5, where its left edge coordinates are equal to the right edge coordinates of subpart 1 (P1) 5008, and the right edge coordinates of subpart 2 are equal to the left edge coordinates of subpart 3 (P3) 5009.

Figure 6:
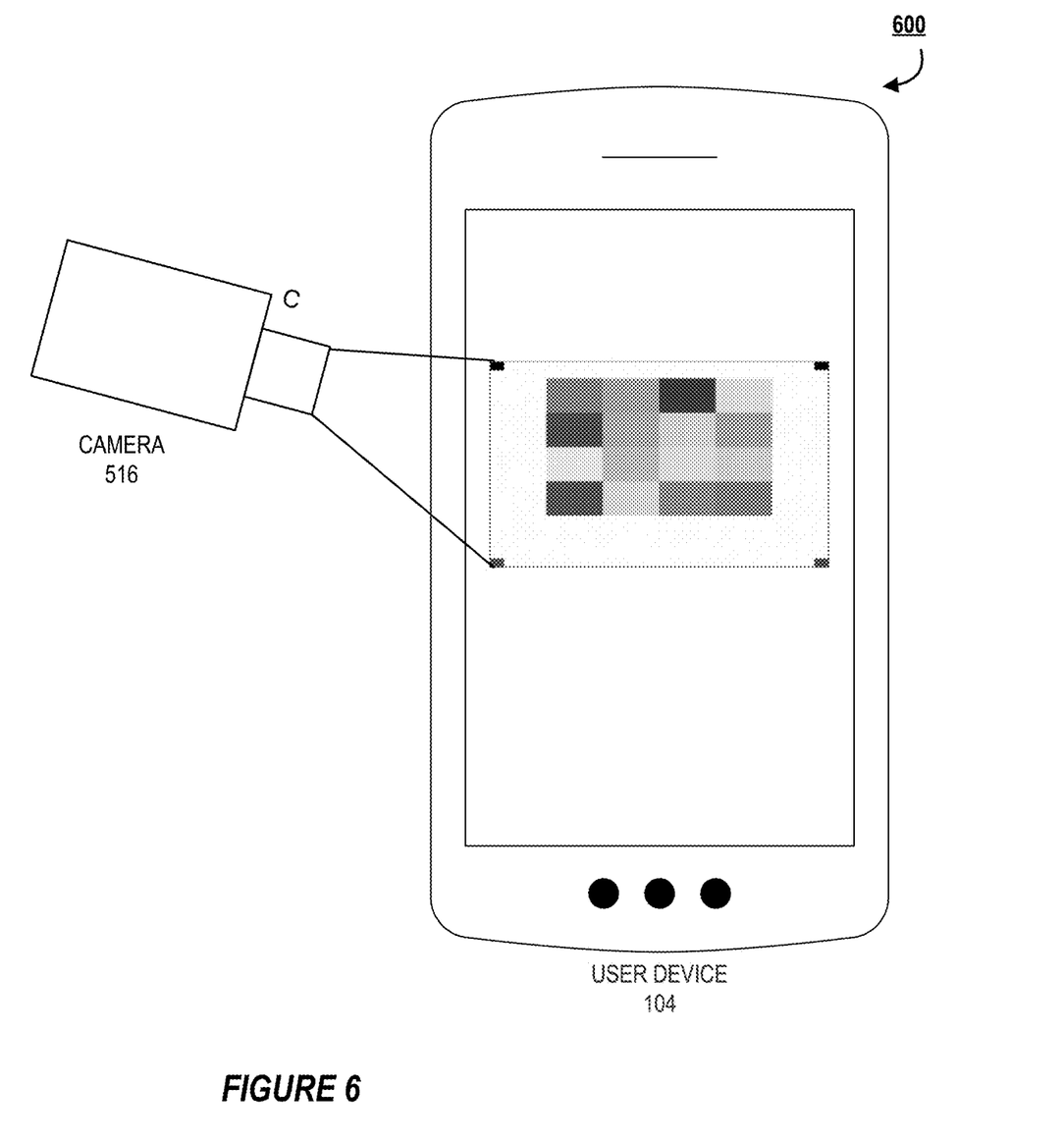
FIG. 6 provides a graphical depiction for display of a dynamic polychrome lattice image on a user device, in accordance with one embodiment of the invention.

FIG. 6 provides a graphical depiction 600 for display of a dynamic polychrome lattice image on a user device, in accordance with one embodiment of the invention. Once the lattice image is generated with a unique color in each part, the entire frame is rendered in the screen as an image for display and scanning purposes. It is understood that the size and image resolution of the dynamic polychrome lattice image can be proportionally adjusted as per the screen size(s) (e.g., various user devices, such as mobile phone screen, laptop, tablet, ATM terminal window, or the like), as shown in the exemplary embodiment of FIG. 6 as a screen of a mobile phone device, a user device 104. As shown in FIG. 6, the camera, optical sensor, or the like, such as camera 516 of a separate user device 104, may be used to scan the dynamic polychrome lattice image and transmit the scanned image to the dynamic image security system 106 over network 101, where the decryption process outlined in FIG. 4 may proceed.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generation of dynamic polychrome lattice images, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
   receive an authentication request or transaction request from a user device;
   generate unique alphanumeric code for the authentication or transaction request using combination of a prefix value, a hashed timestamp, and a hashed random sequence;
   store the unique alphanumeric code as a transaction identifier and log the prefix value, the hashed timestamp, and the hashed random sequence with the transaction identifier as a key value pair;
   assign colors from a color palette to each digit of the transaction identifier and store the color assignments as color mapping data;
   generate x and y coordinate values for an image map;
   calculate coordinates for subparts of the image map for each of the color assignments; and
   based on the calculated coordinates and color assignments, render a polychrome lattice image.

2. The system of claim 1, further configured to:
   receive a scanned image of the rendered polychrome lattice image;
   determine a resolution of the scanned image of the rendered polychrome lattice image;
   convert the scanned image of the rendered polychrome lattice image to an original lattice resolution to generate a normalized polychrome lattice image;
   determine a reference point on the normalized polychrome lattice image;
   identify the subparts and colors of the subparts of the image map on the normalized polychrome lattice image;
   locate the key value pair for the normalized polychrome lattice image in a historical database;
   decrypt identified color codes to reveal the unique alphanumeric code for the authentication request or transaction request; and
   authenticate a user or a transaction.

3. The system of claim 1, wherein colors are assigned from a color palette for each digit of the transaction identifier randomly or pseudo-randomly.

4. The system of claim 1, wherein the x and y coordinate values for the image map are randomly or pseudo-randomly selected from a set of numbers including or between 1 and 7.

5. The system of claim 1, wherein the image map further comprises a frame of 24 by 24 equally sized square or rectangular sections.

6. The system of claim 5, wherein the subparts further comprise areas of 4 by 4 equally sized square or rectangular sections of the frame.

7. The system of claim 5, wherein a top of the frame is denoted by a black square or rectangular section, and a bottom of the frame is denoted by a red square or rectangular section.

8. A computer program product for generation of dynamic polychrome lattice images, the computer program product comprising a non-transitory computer-readable storage medium having computer executable instructions for causing a computer processor to perform the steps of:

receiving an authentication request or transaction request from a user device;

generating unique alphanumeric code for the authentication or transaction request using combination of a prefix value, a hashed timestamp, and a hashed random sequence;

storing the unique alphanumeric code as a transaction identifier and log the prefix value, the hashed timestamp, and the hashed random sequence with the transaction identifier as a key value pair;

assigning colors from a color palette to each digit of the transaction identifier and store the color assignments as color mapping data;

generating x and y coordinate values for an image map;

calculating coordinates for subparts of the image map for each of the color assignments; and  based on the calculated coordinates and color assignments, rendering a polychrome lattice image.

9. The computer program product of claim 8, wherein the computer executable instructions cause the computer processor to perform the steps of:

receiving a scanned image of the rendered polychrome lattice image;

determining a resolution of the scanned image of the rendered polychrome lattice image;

converting the scanned image of the rendered polychrome lattice image to an original lattice resolution to generate a normalized polychrome lattice image;

determining a reference point on the normalized polychrome lattice image;

identifying the subparts and colors of the subparts of the image map on the normalized polychrome lattice image;

locating the key value pair for the normalized polychrome lattice image in a historical database;

decrypting identified color codes to reveal the unique alphanumeric code for the authentication request or transaction request; and  authenticating a user or a transaction.

10. The computer program product of claim 8, wherein colors are assigned from a color palette for each digit of the transaction identifier randomly or pseudo-randomly.

11. The computer program product of claim 8, wherein the x and y coordinate values for the image map are randomly or pseudo-randomly selected from a set of numbers including or between 1 and 7.

12. The computer program product of claim 8, wherein the image map further comprises a frame of 24 by 24 equally sized square or rectangular sections.

13. The computer program product of claim 12, wherein the subparts further comprise areas of 4 by 4 equally sized square or rectangular sections of the frame.

14. The computer program product of claim 12, wherein a top of the frame is denoted by a black square or rectangular section, and a bottom of the frame is denoted by a red square or rectangular section.

15. A computer implemented method for generation of dynamic polychrome lattice images, wherein the method comprises:

receiving an authentication request or transaction request from a user device;

generating unique alphanumeric code for the authentication or transaction request using combination of a prefix value, a hashed timestamp, and a hashed random sequence;

storing the unique alphanumeric code as a transaction identifier and log the prefix value, the hashed timestamp, and the hashed random sequence with the transaction identifier as a key value pair;

assigning colors from a color palette to each digit of the transaction identifier and store the color assignments as color mapping data;

generating x and y coordinate values for an image map;

calculating coordinates for subparts of the image map for each of the color assignments; and  based on the calculated coordinates and color assignments, rendering a polychrome lattice image.

16. The computer implemented method of claim 15, wherein the method further comprises:

receiving a scanned image of the rendered polychrome lattice image;

determining a resolution of the scanned image of the rendered polychrome lattice image;

converting the scanned image of the rendered polychrome lattice image to an original lattice resolution to generate a normalized polychrome lattice image;

determining a reference point on the normalized polychrome lattice image;

identifying the subparts and colors of the subparts of the image map on the normalized polychrome lattice image;

locating the key value pair for the normalized polychrome lattice image in a historical database;

decrypting identified color codes to reveal the unique alphanumeric code for the authentication request or transaction request; and  authenticating a user or a transaction.

17. The computer implemented method of claim 15, wherein colors are assigned from a color palette for each digit of the transaction identifier randomly or pseudo-randomly.

18. The computer implemented method of claim 15, wherein the x and y coordinate values for the image map are randomly or pseudo-randomly selected from a set of numbers including or between 1 and 7.

19. The computer implemented method of claim 15, wherein the image map further comprises a frame of 24 by 24 equally sized square or rectangular sections.

20. The computer implemented method of claim 19, wherein the subparts further comprise areas of 4 by 4 equally sized square or rectangular sections of the frame.

\* \* \* \* \*